(12) United States Patent
Van Alstine (10) Patent No.: US 6,175,819 B1
(45) Date of Patent: Jan. 16, 2001

(54) TRANSLATING TELEPHONE

(76) Inventor: William Van Alstine, Apartment 2147, Tower 7 HK Parkview, 88 Tai Tam Resevoir Road, Hong Kong (HK)

( * ) Notice: Under 35 U.S.C. 154(b), the term of this patent shall be extended for 0 days.

(21) Appl. No.: 09/151,652

(22) Filed: Sep. 11, 1998

(51) Int. Cl.[7] .................................................. G10L 15/00
(52) U.S. Cl. .......................... 704/235; 704/270; 704/277
(58) Field of Search ..................... 704/231, 235, 704/258, 270, 276, 277

(56) References Cited

U.S. PATENT DOCUMENTS

| | | | |
|---|---|---|---|
| 4,882,681 | * 11/1989 | Brotz ..................................... | 364/419 |
| 5,307,456 | * 4/1994 | MacKay ................................ | 395/154 |
| 5,500,920 | * 3/1996 | Kupiec .................................. | 704/270 |
| 5,524,137 | * 6/1996 | Rhee ...................................... | 379/67 |
| 5,615,301 | * 3/1997 | Rivers ................................... | 704/277 |
| 5,697,789 | * 12/1997 | Sameth et al. ........................ | 434/157 |
| 5,701,497 | * 12/1997 | Yamauchi et al. .................... | 395/753 |
| 5,717,828 | * 2/1998 | Rothenberg ........................... | 704/270 |
| 5,724,405 | * 3/1998 | Engelke et al. ....................... | 379/52 |
| 5,882,202 | * 3/1999 | Sameth .................................. | 434/157 |

* cited by examiner

Primary Examiner—Krista Zele
Assistant Examiner—Michael N. Opsasnick
(74) Attorney, Agent, or Firm—Peter Gibson (57) ABSTRACT

Speech into a telephone is converted from an analog to a digital signal using voice recognition and the output shown as text on a visual display. An error may be identified and a supplementary phrase substituted by speech in correction. Closing of a transmit switch sends the digital signal to a computer having linguistic translation software which translates the message into a second language. The resultant linguistically translated digital signal is converted to analog using speech synthesis and sent via a public exchange telephone line to a receiving user who requires only a conventional telephone to receive the translated message and may respond in the second language. The response is converted to a digital signal using voice recognition and translated into the original language by the linguistic translation software. The linguistically translated response is converted into an analog signal with speech synthesis and heard in the original language by the original transmitting user. Each user may have a graphic display device and the ability to correct errors in voice recognition, translation, or speech synthesis by identifying the same upon the graphic display device which may have a pressure sensitive screen for error identification and for closing the transmit switch. A practical system for addressing the difficulties arising from voice recognition, translation and speech synthesis is provided.

45 Claims, 3 Drawing Sheets

TRANSLATING TELEPHONE

BACKGROUND OF THE INVENTION

1. Field of the Invention

The present invention relates generally to the field of telephonic communications; more specifically to a telephone line or system combined with a diverse electrical system, i.e. a composite, including both: (a) a composite substation or terminal and (b) supervisory or control line signalling, substation originated, conversion of signal form, with dynamic memory; furthermore specifically for such a composite system including a telephone combined with a computer possessing multilingual linguistics translation software which recognizes speech in one language and translates the same into another language; particularly such a combined telephone and computer system providing speech translation with means for a user to correct the recognition of their speech using a visual display means and hence the field of the present invention further is inclusive of a telephone line or system combined with a diverse electrical system having transmission of a digital message signal over a telephone line further having a station display, most particularly such a system wherein the station display possesses a pressure or position sensitive surface.

2. General Background

The desirability and value of the capability of speaking via a telephone system to someone in one language and having that speech translated into a second language is considered fairly obvious. It is further recognized that conversion of spoken language, i.e. speech, from analog to digital form and conversion of the translation from digital to analog form is indicated. The first conversion is accomplished with voice recognition, the latter conversion is performed with a speech synthesizer. Digital translation requires translation software for the two languages concerned. There has been, as evidenced in the discussion of the prior art below, a considerable amount of concern connected, though often peripherally, with this basic objective.

As translation software is just now emerging in practicality only relatively little of what is considered pertinent prior art which includes this capability is known. It is considered that the basic objective stated above cannot be achieved with the simple combination of the basic components given above because of the tentative state of translation software and that some other means besides these basic components is required in order to provide a practical system which will enable the user of the system to ameliorate defects in the accuracy of the translation by the software.

For this reason, the prior art considered pertinent to the present invention is comprehensive of telephone systems combined with diverse art elements which would either provide language translation or those combined with another element which is considered pertinent to a means of correcting a conversion of signal to be transmitted by a telephone prior transmission. Such means is further considered to be characterized by possession of a graphic display, particularly one which is pressure sensitive by position.

3. Discussion of the Prior Art

The following patents, each discussed briefly further below, are cited as possessing relevance to the present invention:

| | | |
|---|---|---|
| Japan 357132271 | Aug 1982 | Electronic Translating Device |
| Germany 3403123 | Aug 1984 | Electronic Language Translation Unit - has search facility coupled with marker function to identify words for further reference |
| Japan 360156170 | Aug 1985 | Electronic Translating Machine |
| Japan 361098058 | May 1986 | Automatic Translation International Exchange System |
| Japan 363100855 | May 1988 | Telephone Exchange With Simultaneous Translation Function |
| Japan 363288552 | Nov 1988 | Automatic Translation Telephone System |
| U.S. Pat. No. 4,682,357 | July 1987 | Automobile Telephone Apparatus |
| U.S. Pat. No. 4,707,854 | Nov 1987 | Telephone With Digital Cancellation |
| U.S. Pat. No. 4,882,681 | Nov 1989 | Remote Language Translating Device |
| U.S. Pat. No. 5,384,701 | Jan 1995 | Language Translation System |
| U.S. Pat. No. 5,524,137 | June 1996 | Multi-Media Messaging System |
| U.S. Pat. No. 5,615,301 | Mar 1997 | Automated Language Translation System |
| U.S. Pat. No. 5,701,497 | Dec 1997 | Telecommunication Apparatus Having A Capability of Translation |
| U.S. Pat. No. 5,713,033 | Jan 1998 | Electronic Equipment Displaying Translated Characters Matching Partial Character Input With Subsequent Erasure of Non-Matching Translations. |

Japan 357132271 issued in August 1982 for an 'Electronic Translating Device' discloses switching means for preventing a translated voice output from entering an electronic translating circuit which translates an original voice input through a microphone. A telephone is not mentioned; the device is assumed to be self contained and the innovation simply prevents the generated translated voice from being picked up by the microphone.

Germany 3403123 issued in August 1984 for an 'Electronic Language Translation Unit' which "has search facility coupled with marker function to identify words for further reference" discloses a two line display, keyboard input, and radio receiving and translation from English to Japanese and vice versa, capabilities wherein certain words may be 'marked' for further reference in order to be used as "an electronic word dictionary or language translation dictionary".

Japan 360156170 issued in August 1985 for an 'Electronic Translating Machine' discloses an improvement on the 'Electronic Translating Device' discussed above in which an LCD is added to display the translation and which an operator may extinguish to signify that the voice input was processed and that the translated voice output was not processed.

Japan 361098058 issued in May 1986 for an 'Automatic Translation International Exchange System' discloses a system whereby speech input from a "subscriber is converted into intermediate language codes by a speech recognizing device" and a translation device supplying a "packet exchange device" by which codes are sent to a second translating device and another "speech recognizing device", or speech generator, to provide translated voice output to another subscriber.

Japan 363100855 issued in May 1988 for a 'Telephone Exchange With Simultaneous Translation Function' discloses "channel switching section" which, in response to a "keyword" switches the voice channel over to one with a "translation machine" and which also provides for switching the back to "the original general channel" with termination of the conversation and the translation machine.

Japan 363288552 issued in November 1988 for an 'Automatic Translation Telephone System' discloses a system whereby "a voice is inputted through a hybrid circuit" "to an interactive voice spectrum analyzing part 7 for a designated caller", then "sent to a grammar correcting part 8 as voice pattern information", thence to "an insufficient vocabulary adding part 9", and finally to "a voice synthesizing part 11". The subsequent output from this "standardizing device" "is sent through "an automatic standard voice automatic translating device 15 in an exchange 13" to another standardizing device.

U.S. Pat. No. 4,682,357 issued in July 1987 for an 'Automobile Telephone Apparatus' discloses CPU with memory for repertory dialing, a display screen, keyboard, and annunciator. A code is entered and if a corresponding telephone number is found in memory, this is displayed and a tone is emitted to indicate confirmation. Alternatively another tone is emitted to indicate failure and in either case the driver need not divert their sight.

U.S. Pat. No. 4,707,854 issued in November 1987 for a 'Telephone With Digital Cancellation' discloses an adjunct to a telephone having a microprocessor, memory, keyboard, and display whereby a single digit of a dialled number may be corrected upon the display prior call initiation.

U.S. Pat. No. 4,882,681 issued in November 1989 for a 'Remote Language Translating Device' discloses a system whereby voice inputted into a radio transceiver is relayed to a remote translation computer and the translation transmitted back by radio to the transceiver which annunciates a voiced translation. The necessity of analog to digital conversion is recognized as is the reverse with a speech synthesizer.

U.S. Pat. No. 5,384,701 issued in January 1995 for a 'Language Translation System' discloses a shorthand means of generating full phrases in a second language held in memory as output from keywords in a first language used as input whereby rapid and grammatically accurate translation from speech may be generated.

U.S. Pat. No. 5,524,137 issued in June 1996 for a 'Multi-Media Messaging System' discloses input by diverse media, including voice, and diverse conversion capabilities, including language translation which output may be stored in memory and retrieved by telephone.

U.S. Pat. No. 5,615,301 issued in March 1997 for an 'Automated Language Translation System' discloses use of speech recognition circuitry for audio input connected to "universal translation circuitry" which translates into Esperanto and then translates that output into the user's language which signal is fed into a voice synthesizer for audio output. The audio input is primarily intended to be a television but might be a telephone.

U.S. Pat. No. 5,701,497 issued in December 1997 for a 'Telecommunication Apparatus Having A Capability of Translation' discloses translation of "a received document", i.e. a facsimile, from a "source language" identified with a protocol message into "a target language" in which the document is printed out.

U.S. Pat. No. 5,713,033 issued in January 1998 for an 'Electronic Equipment Displaying Translated Characters Matching Partial Character Input With Subsequent Erasure of Non-Matching Translations' discloses key input into memory of KANA characters, translation of this input into KANJI characters which are displayed and means of "sequentially erasing" the latter.

These references comprise the sum of the pertinent known prior art.

In summary of the prior art, it is considered that various systems for automatic translation are known. Some stand alone and are not intended for use in telecommunications, others so intended rely upon an exchange provided computer for voice synthesis, translation, and voice generation. Display of the telephone number requested by voice and of KANJI characters translated from key inputted KANA characters is known. Correction of a single digit of a telephone number and erasure of KANJI characters upon a screen is known. Association of keywords to full grammatic phrases in a translated language is known. The concept of translating voice in one language into a 'universal language' and then into a second voiced language is disclosed in the prior art.

4. Statement of Need

While the prior art ostensibly includes all the elements for a system whereby a subscriber telephone terminal has access to voice translation capability, i.e., audio to digital signal conversion, digital linguistic conversion from one to another language and reverse capability in translation from the second to the first with voice synthesis and generation of each, via a telephone exchange connected to computer, this particular combination of elements is unknown in the prior art. A single telephone and computer device capable of translation from one language to another, which is fully independent of a public telephone exchange, is considered wholly unknown in the prior art. It is considered that the absence of the latter is related to and indicative of the reason that the former combination of prior art elements is also unknown. It is considered, more specifically, that there is a need for a means at the disposal of the user of such a system for correcting inaccuracies inherent to translation techniques at the current state of that art and that such an effective corrective would be essential to a practical system.

SUMMARY OF THE INVENTION

Objects of the Invention

The encompassing objective of the present invention is the provision of a telephone system which translates speech in one language into another language for reception.

An auxiliary object of the present invention is the provision of a telephone system whereby speech in one language is converted with voice recognition from an analog to a digital signal which is translated by appropriate software into another language in digital form and is then converted into synthesized speech.

Another auxiliary object of the present invention is the provision of a telephone system including means of correcting the speech converted into a digital signal and translated into another language prior to transmission of the translated digital signal and conversion into synthesized speech.

An ancillary object of the present invention is the provision of a telephone system including a graphic display of digital voice recognition output and means of correcting the same prior translation and subsequent transmission via a telecommunication line.

A second ancillary object of the present invention is the provision of a telephone system which translates speech in one language into another language for reception utilizing a computer available upon a public exchange telephone system.

A third ancillary object of the present invention is the provision of a telephone system which translates speech in one language into another language for reception utilizing a computer combined with the telephone and independent of a public exchange telephone system.

Other objects and benefits of the present invention may become readily apparent in a reading of the detailed discussion of the preferred embodiment of the principles relating to the present invention below, particularly if conducted with reference to the drawings attached hereto.

Principles Relating to the Present Invention

The fundamental basis for a delineation of the principles relating to the present invention is that concerned with provision of a means for correcting inaccuracies in linguistically translated test prior transmission over a telephone line to the receiving party. It is considered that this means of correction is best utilized by the transmitting user, which is opposed to the receiving user, though there is an ancillary usage by the receiving user as well. In either case the mechanics of the signal conversion required are first considered.

The analog signal comprised by the original speech must be first recognized with voice recognition software which converts the speech into a first digital signal which is then translated by linguistic translation software in a computer into another digital signal. It is considered that a primary source of inaccuracy in digital linguistic translation is inherent to the difficulties involved in speech recognition wherein the sound waves comprising the original analog signal are converted into digital data. If the words spoken by the transmitting user are not properly recognized the resulting translation is flawed at best and easily rendered hopeless. It is hence considered that the transmitting user requires a means of correcting the first digital signal resulting from voice recognition prior to the sending of this first digital signal to the translation software.

It is suggested that this first digital signal be routed to a means for holding in dynamic memory and visually displaying the speech recognized so that the transmitting user can identify errors in the same. It is further suggested that this visual display means possess a pressure sensitive screen which correlates by position the area containing the error with the erroneous text. The transmitting user might use a wand or other tool, perhaps a finger, to identify errors on the screen by touching the same. Alternatively, a cursor upon the screen might be positioned, either by keys or a mouse, upon the error in recognized speech as given by the text displayed, in order to identify the same. After identification of the error a correction is made by enunciating more clearly the passage misinterpreted in speech recognition. A substitute phrase for the original might be entered as well in correction.

These steps of speaking, recognition, display and correction may be reiterated. When the transmitting user is satisfied with the speech recognized digitally approval is indicated by closing a transmit switch and the second digital signal thus approved is transmitted to the translation software resident in a computer followed by transmission over a telephone line of a third digital signal which has been linguistically translated into another language to the receiving party, i.e. the receiving user.

This third digital signal, and the second digital signal as well, may be displayed upon a display unit on the receiving end as well as upon the display unit upon the transmitting end. If one of the two parties understands some of the other language involved an error in the third signal may be identified and correction by that party attempted. The receiving user can, if the third digital signal is displayed upon a receiving display unit, at least identify an area of difficulty in translation which can be correlated to a portion of the second digital signal upon the display screen of the transmitting user. A substitute phrase or rewording of this portion may then be tried by the transmitting user. In this manner the errors introduced by the translation software in addition to the errors in speech recognition may be addressed and ameliorated.

DETAILED DISCUSSION OF THE PREFERRED EMBODIMENT

Figure 1:
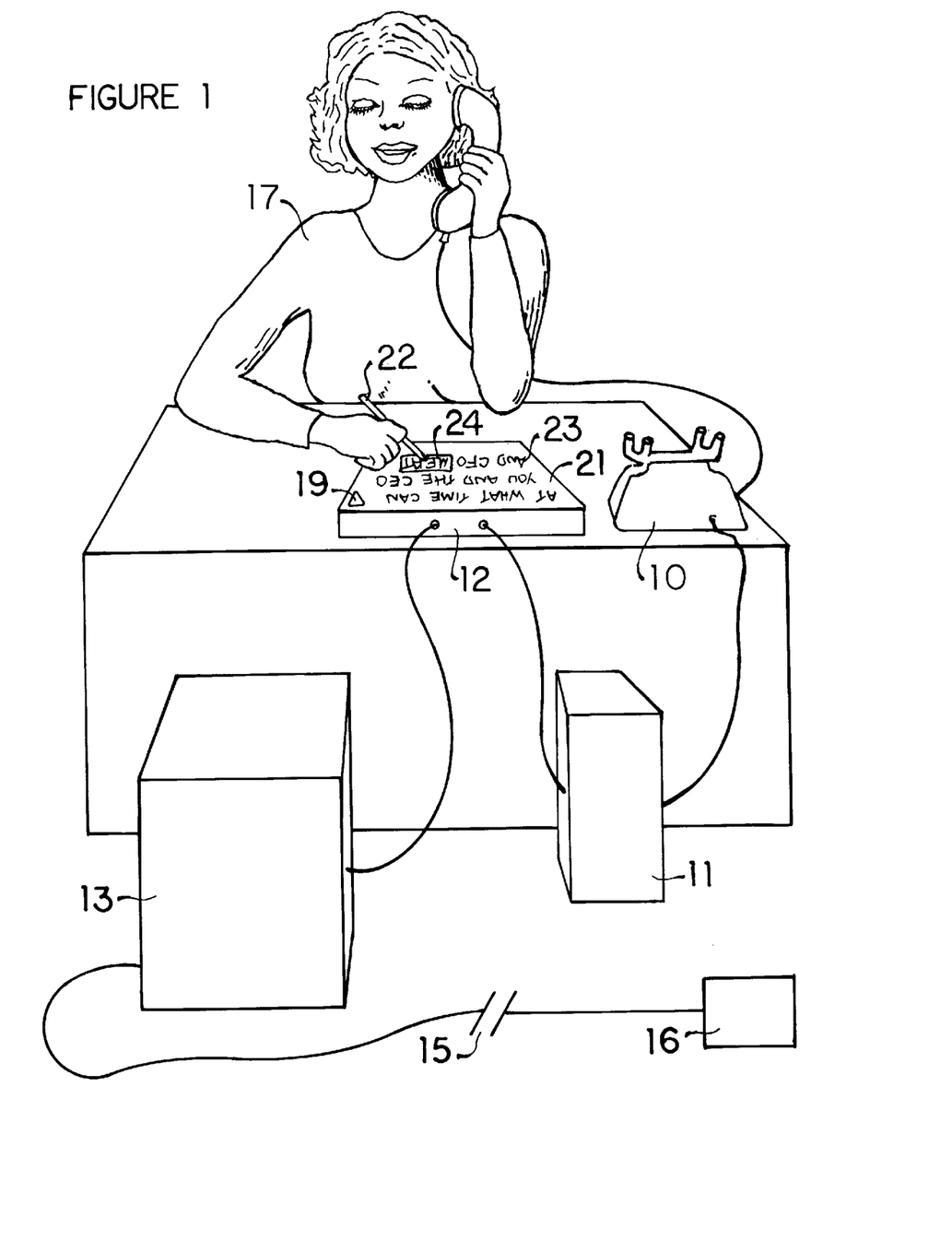
FIG. 1 is a vanishing point perspective view of someone using a preferred embodiment in accordance with the principles relating to the present invention.
Figure 3:
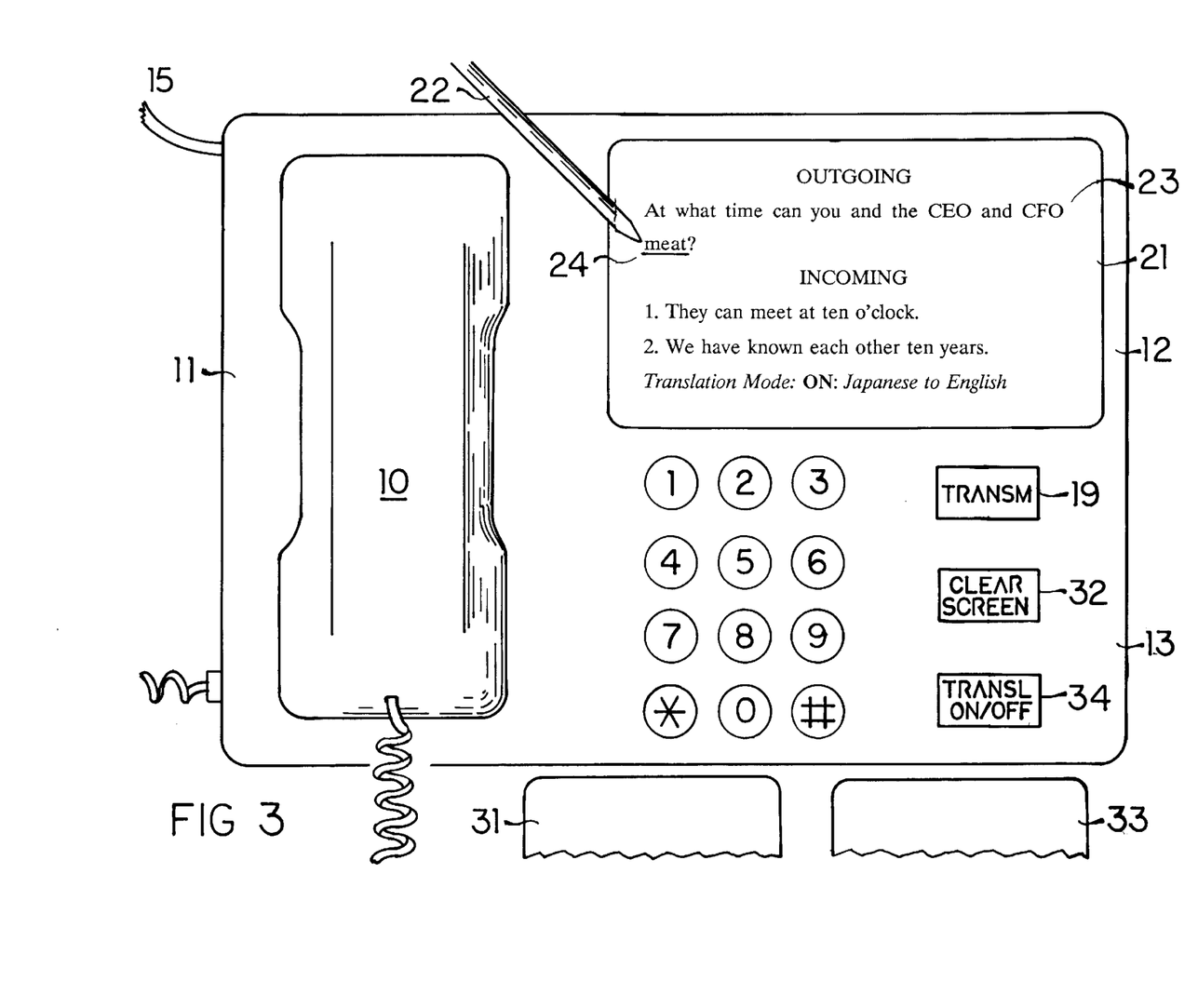
FIG. 3 is a plain elevational view taken from the top of a device useful in fulfillment of a preferred embodiment in accordance with the principles relating to the present invention.

FIG. 1 shows a telephone 10 operably connected to a signal converter 11 which is operably connected to a visual display device 12 which is operably connected to a linguistic translation computer 13 which is operably connected to a public exchange (PBX) 15 through which an operable telephone line connection is made with a receiving user 16. The telephone 10, as shown in FIG. 1, stands alone from the other components, however, the operable connection of this telephone 10 to the PBX 15 is through three intermediary components: a signal converter 11, a visual display device 12, and a linguistic translation computer 13. It is considered that the telephone 10 possesses an operable connection with the PBX 15 regardless of the functioning of these intermediary components. It is also considered that the telephone 10 may be combined with any of these three components 11, 12, 13 intermediary to the telephone 10 and the PBX 15, as shown in FIG. 3 and further that any of these three components 11, 12, 13 may be combined with each other. The principles relating to the present invention require operation of these components 11, 12, 13 with a telephone 10 in a manner enabling certain capabilities for transmission over a PBX 15.

The telephone 10 provides the function commonly associated with such a device: conversion of speech, which consists of sound waves, into an electrical signal in transmission and conversion of an electrical signal into speech in reception. The electrical signal in either case may be digital or analog but may be assumed to be an analog signal in order to more easily distinguish it from the subsequent signal which must be digital. Analog to digital (A/D) conversion and the reverse, digital to analog (D/A) conversion, is effected by a signal converter 11. A/D conversion converts the electrical signal produced by the telephone into a digital signal which is suitable as input to both the visual display device 12 and the linguistic translation computer 13. A/D conversion, as regarding the principles relating to the present invention, essentially performs voice recognition which requires an appropriately programmed microprocessor.

What is known herein as D/A conversion converts a digital signal either received from or transmitted to a PBX 15 into what is also known herein as an electrical signal suitable for telephone reception. The conversion could actually effect a digital to digital conversion, if the telephone 10 operates with reception/transmission of a digital signal. Most importantly, with regard to the principles relating to the present invention, this conversion, known as the D/A conversion, conducts voice synthesis which also, as in the A/D conversion, requires an appropriately programmed microprocessor. The signal converter 11 is hence a device which includes an appropriately programmed microprocessor and possesses the capability of either A/D or D/A conversion as defined above and preferably possesses both capabilities.

Both a linguistic translation computer 13 and a signal converter 11 may be operably connected to both a visual display device 12 and a telephone 10 via a PBX 15 in which case each direct connection represented in FIG. 1 between these components would comprise a loop through the PBX 15. For example, the direct connections represented in FIG. 1 between the telephone 10 through the signal converter 11 to the visual display device 12 would be from the telephone 10 through the visual display device 12 through the PBX 15 to the signal converter 11 and back through the PBX 15 to the visual display device 12.

It is the functional relations between these components which are necessary to fulfillment of an embodiment in accordance with the principles relating to the present invention. The signal converter 11 receives an electrical signal from the telephone 10 in transmission and utilizes speech recognition technology to convert that signal into what is called herein a first digital signal which the visual display device 12 is capable of holding in dynamic memory and representing upon a display screen 21 as text 23. In the case of an originating digital signal what is conventionally known as an A/D conversion is not necessary and the digital signal from the telephone 10 may be processed directly by the voice recognition software. What is known herein as a first digital signal is that signal resulting from the conversion effected by voice recognition software.

The signal resultant from processing by voice recognition software is necessarily digital while the originating signal may be analog and hence, in order to simplify the terminology used herein, the electrical signal from a telephone resulting from speech received thereby is assumed to be analog though it may, in fact, be digital, and the first digital signal is that signal resultant from processing by voice recognition software and any other signal processing, such as A/D conversion, which is required to so process the signal derived from speaking into a telephone 10.

Figure 2:
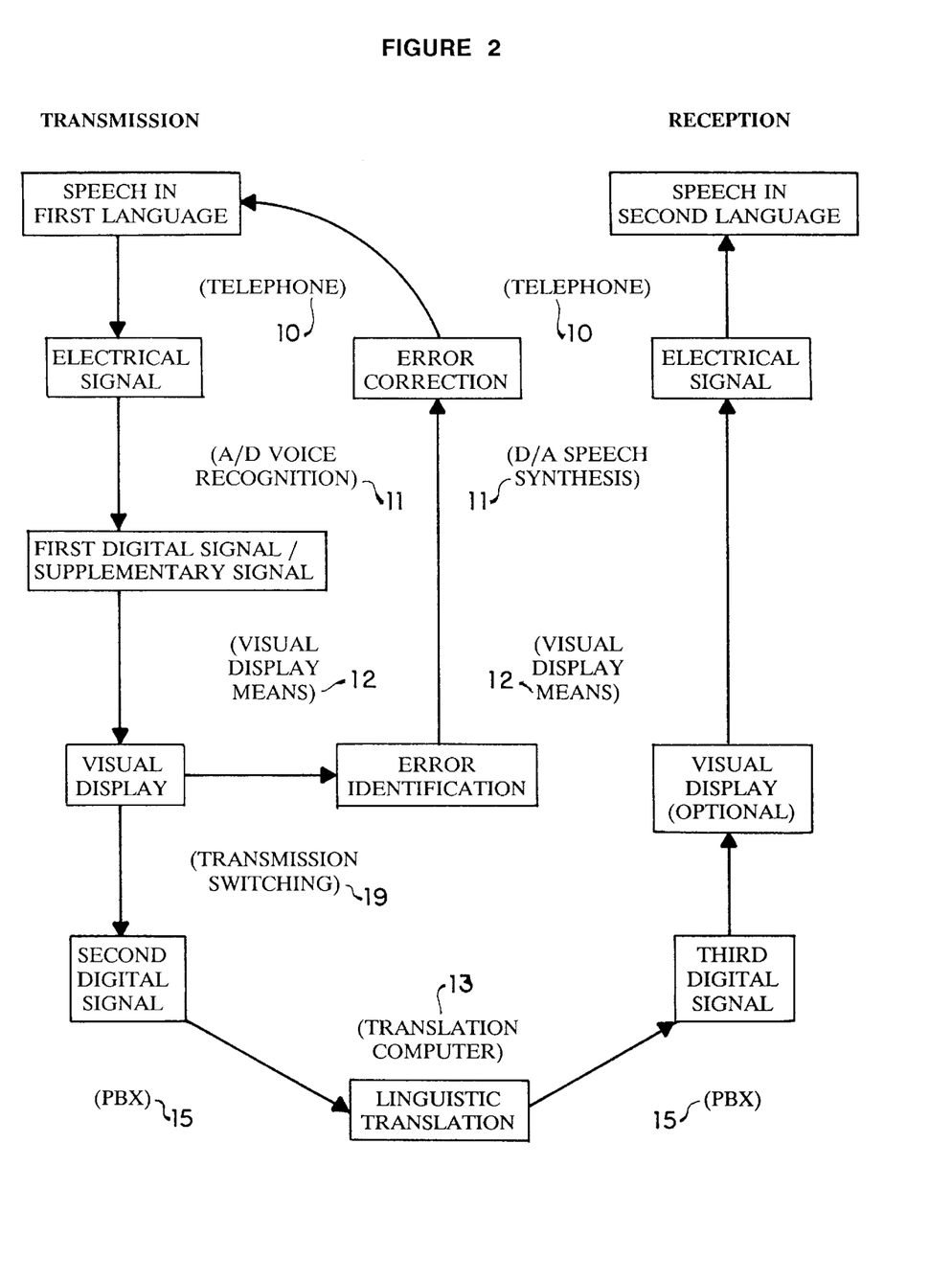
FIG. 2 is a schematic of the steps associated with fulfillment of a preferred embodiment in accordance with the principles relating to the present invention.

Either the transmitting user or receiving 17, 16 has identification means 22, depicted in FIGS. 1 & 3 as a wand held in a hand, with which an area upon the display screen 21 may be selected for identification of an error 24 in the first digital signal resulting as output from what is termed in FIG. 2 as A/D voice recognition which is a signal conversion by the signal converter 11. It is not necessary that a wand be used as the identification means 22, but it is necessary that a portion of the text 23 displayed in representation of the first digital signal can be identified for purposes of attempting correction of an error 24. Rather than a wand as a means of identification 22, a cursor upon the display screen 21 is also suggested, controlled by either keys or a mouse. In the case represented in FIGS. 1 & 3 in which a wand is utilized as the identification means 22 the display screen 21 must be pressure sensitive by position. In any case the portion of the display screen 21 identified is associated with a portion of the text 23 displayed, i.e. the error 24. It is suggested that this portion of text 23 so identified upon the display screen 21 be highlighted or otherwise marked as an indication that the portion of the screen 21 identified has been associated with the error 24.

With this accomplished the system expects a supplementary digital signal from the signal converter 11 using voice recognition in what is known herein as A/D conversion of signal received from the transmitting user 17 via the telephone 10 which supplants the error 24 identified with a new portion of text 23. This sequence may be reiterated, as indicated in FIG. 2. When the text 23 displayed on the visual display unit is satisfactory to the transmitting user 17 transmission switching means 19 are closed thereby effecting transmission. Transmission switching means 19 are depicted in FIG. 1 as a reserved portion of the display screen 21 of the visual display device 12, and as a button labeled TRANSM for transmit, in FIG. 3. Transmission switching means 19 may constitute any means for initiating transmission of a second digital signal to the linguistic translation computer 13.

This second digital signal is a first digital signal which has been approved. If no errors 24 were corrected then closing the transmission switching means 19 will cause the original first digital signal to be sent to the linguistic translation computer 13. A first digital signal, either original, modified, the last of many modifications or full substitutions, becomes the second digital signal after the transmission switching means 19 is closed. In other words the first digital signal in the state prior to closing the transmission switching means 19 becomes the second digital signal after closing of the same which action connotes approval of the A/D conversion effected by the signal converter 11 using voice recognition which result is displayed on the display screen 21 of the visual display unit 12.

The linguistic translation computer 13 receives the second digital signal after this approval, as depicted in FIG. 2, and produces a third digital signal which reflects the conversion of the second digital signal from a first language in which speech in transmitting was made into a second language which is received by the receiving user 16. This third digital signal is then converted by the signal converter 11 using speech synthesis which is assumed to further effect a D/A signal conversion of the third digital signal into an electrical analog signal, though this may be unnecessary, but which primarily generates a signal which may be converted into speech in the second language by an ordinary telephone 10, regardless of whether that telephone 10 operates with a digital or analog signal. In this case the receiving user 16 must have a telephone 10 operably connected to a PBX 15 but requires nothing further.

It is considered, however, that the third digital signal, without D/A conversion, is sufficient for a visual display device 12 possessed by the receiving user 16 to display text 23 in the second language and that a voice synthesis by a signal converter 11 would then be unnecessary. If the receiving user 16 has such a visual display device 12 along with identification means 22 for indicating a portion of the translated text 23 then a portion thereof which is poorly translated may be identified and the corresponding portion of the text 23 in the first language highlighted or otherwise marked so that the transmitting user 17 can provide a supplementary digital signal by rephrasing the portion of the text 23 concerned.

The text 23 upon the display screen 21 of either visual display device 12 may further juxtapose the first and third digital signals, i.e. the original and the translated language, so that if either user 16, 17 has some knowledge in the other language defects in translation may be identified and clarification with a supplementary digital signal attempted. If the receiving user 16 has: (a) the capability of having their speech linguistically translated, (b) a visual display device 12, and (c) means for identification 22 of errors 24; then the receiving user 16 can identify text 23 corresponding to the third or translated digital signal and suggest another phrase in the second language, i.e. enter a supplementary digital signal, which will be translated back into the first language and be displayed as text 23 upon the display screen 21 viewed by the originally transmitting user 17. Particular phrases which have been translated can at minimum be identified as lacking clarity and replacement phrasing requested or the meaning of the phrase queried.

It is considered highly desirable to have a system in accordance with the principles relating to the present invention wherein all components other than the telephone 10 and the visual display device 12 are accessed via the PBX 15. The large cost of the other components, namely the signal converter 11 and the linguistic translation computer 13, most particularly the latter, and the desirability of handling two different languages selected from a greater number of possible languages both recommend that both said components 11, 13 be maintained at a facility which is accessible over a PBX 15 by subscription. The visual display unit 12 could have all the electronics necessary to ensure operation with an ordinary telephone 10 including verification means for ensuring valid subscription.

The telephone 10 and visual display device 12 may either be separate, as shown in FIG. 1, or combined, as shown in FIG. 3, into a single unit which is operably connected to a PBX 15. The operation with regard to signal path and the functions afforded by the system may be functionally equivalent with the telephone 10 and visual display device 12 combined or separate if operably connected to each other. The capabilities of a system in accordance with the principles relating to the present invention may vary as discussed above, depending on whether the receiving user 16 has a visual display device 12 with capabilities similar to that possessed by the transmitting user 17, and depending upon the further additional capabilities these two visual display devices 12 might have in conjunction with the system as also discussed above.

As seen in FIG. 3, a single unit may combine a telephone 10, a signal converter 11, capable of either but preferably both voice recognition and speech synthesis, a means of visual display 12 including a visual display screen 21, and a translating computer 13 with appropriate software which is contained upon a PCMCIA card 33. The voice recognition software is similarly shown as contained upon a PCMCIA card 31 which structure enables other, updated or different, software programs to be utilized. Having the translation software upon a PCMCIA card 33 allows one to change the language translation effected as well as update or otherwise alter the software. Additional features shown in FIG. 3 include a clear screen switch 32 which initiates erasure of the text 23 upon the display screen 21 and an on/off switch 34 which activates and deactivates the translation capabilities. With the on/off switch 34 closed speech into the telephone 10 is converted with the voice recognition software into a first digital signal which displayed is as text 23 upon the display screen 21 and in which errors 24 may be corrected using error identification means 22 while transmission is effected in this case by closing the transmit switch 19. The second digital signal thus approved is first linguistically translated and then converted using speech synthesis before being transmitted over a PBX 15 as a third digital signal in a second language which can be received by an ordinary telephone 10.

With regard to component location it also seems logical to have the linguistic translating computer 13 located remotely from either user 16, 17. This is considered to be the most expensive component of the system and the linguistic translating computer 13 is also suited by signal path to be accessible via the PBX 15 because both it and the visual display device 12 require a digital signal. It is hence suggested that the telephone 10 and the visual display device 12, which both must be located on the premises of either a transmitting user 17 or a receiving user, be either combined or operably connected substantially as shown in FIG. 1 with the signal converter 11.

It is considered however, that in order for either party, transmitting user 17 or receiving user 16, to function with only an ordinary telephone 10 operably connected to a PBX 15, the other party having a visual display device 12 and a signal converter 11, the linguistic translating computer 13 will additionally require a signal converter 11 in order to provide the party with only an ordinary telephone 10 with an electrical signal which that telephone 10 may convert into sound. This D/A conversion, as mentioned earlier, most importantly includes what is known as voice synthesis though the actual annunciator is upon the telephone 10 and this electrical signal, with regard to both transmission and reception, was assumed to be analog. This may not necessarily be the case and the electrical signal may be digital, however, it is still an electrical signal which is considered as significantly different than the third digital signal derived from the linguistic translation computer 13 as the third digital signal can be read directly by the visual display device 12 but not by an ordinary telephone 10.

It is hence considered that while it is attractive with regard to signal path to have a signal converter 11 in between the telephone 10 and the visual display 12, unless the other party has a similar arrangement the linguistic computer 13 accessible via a PBX 15 must have the additional capability of voice synthesis with a signal converter 11 in order to provide what is known herein as an electrical signal which an ordinary telephone 10 can read as input and which has been assumed to be analog for ease in definition.

As has also been mentioned previously, a system in accordance with the principles relating to the present invention provides certain functions or capabilities which require the components defined above but allow variation in arrangement of the same. It has been noted that if a transmitting user 17 has the prerequisite capabilities the receiving user 16 requires no more than an ordinary telephone 10 for reception of linguistically translated speech. The converse also holds: if a receiving user 16 has the prerequisite capabilities the transmitting user 17 requires no more than an ordinary telephone 10 for translation of linguistically translated speech. While additional capabilities are recognized wherein both users 16, 17 possess a visual display device 12 and the capabilities associated with it as well as those provided by the linguistic translation computer 13, it is sufficient to fulfillment of the principles relating to the present invention that one said user possesses a visual display device 12 and has the capabilities provided by a linguistically translating computer 13 and a signal converter 11.

The essential capabilities of a system in accordance with the principles relating to the present invention are considered with reference to FIG. 2 wherein it is first observed that there is a basic similarity in opposed directions from the central step of linguistic translation with respect to the signal path: at each end is speech, followed/preceded by the telephone, A/D or D/A conversion, and display. It is assumed, however, that the transmitting receiver 17 has a visual display device 12 and identification means 22 operable thereon. The supplementary digital signal is hence depicted upon the transmission side and the display of what can include both the second digital signal as well as the third digital signal on the reception side is noted as optional. And closing of the transmission switching means 19 which causes the second digital signal to be sent to the linguistic translating computer 13 is upon the transmission side.

As observed above, this may be reversed, with the transmitting user 17 having only an ordinary telephone 10. In this case the identification of errors 24 utilizing a visual display device 12 is conducted by the receiving user 16. The digital signal viewed thereon is not the output of voice recognition A/D signal conversion by a signal converter 11 but the linguistically translated signal output of the linguistic translation computer 13. Errors 24 introduced by both linguistic translation as well as voice recognition are encompassed. The salient point, however, is that these errors 24 can still be graphically identified and addressed with supplementary text. This is considered to be the single most important capability obtained by the various components of a system in accordance with the principles relating to the present invention because this capability is vital to a practical system which undertakes to provide linguistic translation between parties over the telephone.

Hence while the foregoing has been intended to provide what is considered to be the best manner of making and using a system in accordance with the principles relating to the present invention, the same is not to be considered as restrictive in any manner of the rights and privileges obtained by Letters Patent nor restrictive in any manner the scope of the material to be protected for which I claim:

1. A system for providing practical multilingual linguistic translation via a public telephone exchange, said system comprising:

voice recognition means for converting an electrical signal resulting from speech into a telephone into a first digital signal;

visual display means for displaying as visual text a received signal including dynamic memory capable of holding i.e. storing said digital signal;

error identification means for identifying a portion of the visual text displayed on said visual display device;

correction means for substituting a supplementary digital signal resulting from conversion of speech into said telephone by said voice recognition means following identification of an error on said visual display device;

transmission switching means for sending a second digital signal held in memory by said visual display means over a public telephone exchange line;

translation means for linguistic translation by software resident in a computer capable of translating a digital signal resulting from said voice recognition means inclusive of said second digital signal held in said dynamic memory included in said visual display means from a first digital language into a second language and transmitting a resultant third digital signal over a public telephone exchange;

operable connections between: said telephone and said voice recognition means, said voice recognition means and said visual display means, said visual display means and said transmission switching means, said transmission switching means and said translation means, said translation means and a public telephone exchange;

whereby speech into a telephone operably connected to said voice recognition means operably connected to said visual display means is converted into a first digital signal and displayed as visual text, a portion of said text maybe identified as erroneous and correction effected with said supplementary digital signal, the second digital signal held in dynamic memory included in said visual display means maybe approved with said transmission switching means and translated by said translation means into a third digital signal in a second language transmitted over and receivable from a public telephone exchange.

2. The system of claim 1 wherein said speech synthesis means and said voice recognition means are combined in one signal converter.

3. The system of claim 1 wherein said voice recognition means includes analog to digital signal conversion.

4. The system of claim 1 wherein said voice recognition means does not include analog to digital signal conversion.

5. The system of claim 1 wherein said voice synthesis means includes digital to analog signal conversion.

6. The system of claim 1 wherein said voice synthesis means does not include digital to analog signal conversion.

7. The system of claim 1 wherein said translation software is held in memory upon a PCMCIA card.

8. The system of claim 1 wherein said voice recognition software is held in memory upon a PCMCIA card.

9. The system of claim 1 wherein said visual display means possesses the capability of visually displaying said third digital signal.

10. The system of claim 1 further including a second visual display means upon which said third digital signal may be visually displayed.

11. The system of claim 10 wherein said second visual display means further possesses the capability of displaying said second digital signal as text.

12. The system of claim 1 wherein said visual display means includes a pressure sensitive screen which is capable of recognizing a portion of said visual text displayed thereon by position.

13. The system of claim 12 wherein said transmission switching means is comprised of a reserved portion of said pressure sensitive screen.

14. The system of claim 1 further including speech synthesis means operably connected to said public telephone exchange for converting said third digital signal into an electrical signal which a telephone connected to said public telephone exchange can reproduce as spoken speech in said second language.

15. The system of claim 14 wherein said speech synthesis means possesses an operable connection with said translation means through a public telephone exchange.

16. The system of claim 14 wherein said speech synthesis means possesses a direct operable connection with said translation means.

17. The system of claim 16 wherein said speech synthesis means and said translation means are combined in a single device.

18. The system of claim 1 further including a clear screen switch which erases said text upon said display screen.

19. The system of claim 1 wherein said translation means is combined with said visual display means in a single device.

20. The system of claim 1 wherein said operable connection between said transmission switching means and said translation means is through a public telephone exchange.

21. The system of claim 1 wherein said transmission switching means possesses a direct operable connection to said translation means.

22. The system of claim 21 wherein said transmission switching means and said translation means are combined in a single device.

23. The system of claim 22 wherein said transmission switching means is comprised of a manually operated switch upon said single device.

24. The system of claim 1 wherein said telephone is combined with said visual display means in a single device.

25. The system of claim 1 wherein said telephone is combined with said translation means in a single device.

26. The system of claim 25 further possessing an on/off switch upon said single device providing for selective functioning of said translation means.

27. The system of claim 1 wherein said voice recognition means possesses a direct operable connection to both said telephone and said graphic display means.

28. The system of claim 27 wherein said voice recognition means is combined with said translation means in a single device.

29. The system of claim 1 wherein said voice recognition means possesses a direct operable connection to both said telephone and to said visual display means.

30. The system of claim 29 wherein said voice recognition means is combined with said telephone in a single device.

31. The system of claim 30 further including said translation means combined with said voice recognition means and said telephone in a single device.

32. The system of claim 30 further including said visual display means combined with said voice recognition means and said telephone in a single device.

33. The system of claim 1 wherein said translation means is capable of linguistically translating said second language into said first language.

34. The system of claim 33 further including speech synthesis means operably connected to said public telephone exchange for converting said third digital signal into an electrical signal which a telephone connected to said public telephone exchange can reproduce as spoken speech in said second language.

35. The system of claim 34 wherein said speech synthesis means possesses an operable connection with said translation means through a public telephone exchange.

36. The system of claim 34 wherein said speech synthesis means possesses a direct operable connection with said translation means.

37. The system of claim 36 wherein said speech synthesis means and said translation means are combined in a single device.

38. The system of claim 33 possessing two voice recognition means each directly connected to both a graphic display means and a telephone.

39. The system of claim 38 possessing two graphic display means each directly connected to one said transmission switching means operably connected to said translation means.

40. The system of claim 38 possessing two error identification means each operably connected to one said graphic display means.

41. The system of claim 40 possessing two correction means each operably connected to one of said two error identification means.

42. The system of claim 38 wherein each of both said graphic display means possesses the ability to display said third digital signal as text in addition to said second digital signal.

43. The system of claim 42 wherein at least one said graphic display means is operably connected to an error identification means pertaining to said display of said third digital signal as text.

44. The system of claim 43 wherein said error identification means pertaining to said display of said third digital signal as text is operably connected to correction means pertaining to said display of said third digital signal as text.

45. The system of claim 44 wherein said correction means pertaining to said display of said third digital signal as text is operably connected to transmission switching means for transmission of a corrected third digital signal.

* * * * *

UNITED STATES PATENT AND TRADEMARK OFFICE
CERTIFICATE OF CORRECTION

PATENT NO.   : 6,175,819 B1
DATED        : January 16, 2001
INVENTOR(S)  : William Van Alstine It is certified that error appears in the above-identified patent and that said Letters Patent is hereby corrected as shown below:

<u>Column 12,</u>
Line 10, replace "maybe" with -- may be --.
Line 13, replace "maybe" with -- may be --.

Signed and Sealed this

Thirtieth Day of October, 2001

*Attest:*

*Attesting Officer*

NICHOLAS P. GODICI
*Acting Director of the United States Patent and Trademark Office*